United States Patent [19]

Forand et al.

[11] Patent Number: 4,597,770
[45] Date of Patent: Jul. 1, 1986

[54] COAL-WATER SLURRY COMPOSITIONS

[75] Inventors: Joseph T. Forand, Fairfield; James A. Hellyer, Milford, both of Ohio

[73] Assignee: The Procter & Gamble Company, Cincinnati, Ohio

[21] Appl. No.: 686,115

[22] Filed: Dec. 24, 1984

[51] Int. Cl.[4] .................................................. C10L 1/32
[52] U.S. Cl. ........................................... 44/51; 44/77; 252/352; 536/18.3; 536/18.6
[58] Field of Search ............... 44/51, 77; 252/352; 536/18.3, 18.6

[56] References Cited

U.S. PATENT DOCUMENTS

| | | | |
|---|---|---|---|
| 3,219,656 | 11/1965 | Bolttner | 252/352 |
| 3,737,426 | 6/1973 | Throckmorton et al. | 252/352 |
| 3,772,269 | 11/1973 | Lew | 252/352 |
| 4,302,212 | 11/1981 | Yamamura | 44/51 |
| 4,472,170 | 9/1984 | Hellyer | 44/51 |

FOREIGN PATENT DOCUMENTS 0405195 2/1934 United Kingdom .

Primary Examiner—William R. Dixon, Jr.
Assistant Examiner—Margaret B. Medley
Attorney, Agent, or Firm—Richard C. Witte; Ronald L. Hemingway

[57] ABSTRACT

Aqueous coal slurries comprising comminuted coal, water and sulfated O-glycoside surfactant. The sulfated O-glycoside serves as a highly efficient dispersant for the coal particles, permitting the achievement of low viscosity slurries at low surfactant usage levels.

11 Claims, No Drawings

COAL-WATER SLURRY COMPOSITIONS

TECHNICAL FIELD

The present invention relates to aqueous slurries of coal powder. More particularly, the invention relates to the use of surfactants which allow the production of pumpable, high solid content suspensions of finely-ground coal in water. These suspensions can then be transported by pipeline or be handled by a country's existing fuel oil infrastructure (barges, tank cars, tank trucks, storage tanks, pipelines) and be burned in coal-, oil-, or gas-designed boilers, furnaces, etc.

SUMMARY OF THE INVENTION

The invention is directed to the use of sulfated O-glycoside surfactants as dispersing agents for aqueous coal slurries.

BACKGROUND

Due to the limited availability and rising cost of petroleum, it is becoming increasingly desirable to develop nonpetroleum energy sources and to maintain a stable supply thereof. The more effective utilization of coal, which would greatly reduce the dependence of the world economy on petroleum, is now being enthusiastically reconsidered. However, since coal is a solid, its use presents transportation and handling difficulties not encountered with petroleum.

In order to facilitate handling and use of coal, coal-water slurries ("CWS"), consisting of fine particles of coal dispersed in water, have been developed. The amount of water necessary to form a pumpable slurry varies with the surface characteristics and extent of comminution of the coal. Without additives, a coal slurry made up of particles, most of which will pass through a 200 mesh Tyler sieve can only contain from about 40 to 45 weight percent coal. When the coal content of a slurry (without additives) is increased much beyond this level, the viscosity of the slurry rises markedly and the slurry becomes unpumpable. To disperse the coal particles in water, achieve a high solids content slurry, and maintain an acceptable slurry viscosity, it is necessary to use a surfactant to reduce the coal-water surface tension and thereby facilitate the wetting of particle surfaces. A suitable surfactant must also function to prevent the recombination of coal particles into large clusters. Also, a suitable surfactant must retain its dispersing function during and following slurry preparation and handling conditions involving high shear, such as comminution, mixing and pumping. See, for example, U.S. Pat. Nos. 4,302,212, Yamamura et al., issued Nov. 24, 1981; 4,304,572, Wiese et al., issued Dec. 8, 1981; and 4,104,035, Cole et al., issued Aug. 1, 1978; 4,282,006, Funk, issued Aug. 4, 1981; and 4,358,293, Mark, issued Nov. 9, 1982, all incorporated by reference herein. In general anionic surfactants, and in particular the sulfonates, have been recognized as the preferred class of surfactants for coal slurries.

U.S. Pat. No. 4,472,170, Hellyer, issued Sept. 18, 1984, and incorporated by reference herein, discloses nonionic alkyl glycosides as highly desirable surfactants for aqueous coal slurries.

Since surfactants add to the cost of the slurry without providing any significant increase in fuel value, it is desirable to employ surfactants which are relatively inexpensive and highly efficient; i.e., those which can be used at low levels and still provide low vicosity, easily pumpable slurries. Also, since many anionic surfactants contain elements such as sulfur, phosphorus or nitrogen, it is desirable to use these surfactants at the lowest possible levels in order to minimize air pollution by sulfur, phosphorus or nitrogen combustion products when the slurry is burned. Metallic cations (e.g., Na or K) in anionic surfactants produce ash and can contribute to slagging and fouling in boilers when the slurry is burned. Thus, low usage level of anionic surfactant in the slurry is also desirable in order to minimize ash formation.

The object of the present invention is to provide superior surfactants for use as dispersants in coal-water slurries. A further objective is to provide anionic sulfate surfactants which are highly efficient dispersants for coal-water slurries, thereby making it possible to use the surfactants at low levels and thus minimize introduction of air pollution-producing, or ash-producing, elements.

DESCRIPTION OF THE PREFERRED EMBODIMENTS

In accordance with the present invention, it has been found that sulfated O-glycosides are superior surfactants for use in coal-water slurries. O-glycosides are compounds composed of the residue of an aliphatic or aromatic alcohol (called the aglycone) bonded through oxygen to the hemiacetal or hemiketal carbon of a saccharide residue which in turn may be bonded through oxygen linkages to other saccharide residues. Reaction of these compounds with sulfating agents such as sulfuric acid or $SO_3$, followed by neutralization with a base such as sodium or ammonium hydroxide, produces the sulfated O-glycosides.

It has now been discovered that the sulfated O-glycosides provide suitable, low viscosity, aqueous coal slurries at substantially lower usage (on an active basis) level than various other anionic surfactants such as naphthalene sulfonates or lignosulfonates which have been used for this purpose. This discovery, along with the fact that the sulfated O-glycosides are made from relatively inexpensive raw materials, makes this class of surfactant highly desirable as a dispersant for coal slurries.

Coal-water slurries of the present invention comprise:
a. from about 50 wt. % to about 85 wt. % of finely divided coal particles having a particle size such that substantially none of said particles has a size greater than 4 mesh (all mesh sizes herein are with reference to the Tyler Standard Screen system unless specified otherwise);
b. from about 0.01 wt.% to about 5 wt.% of sulfated O-glycosides; and
c. from about 10 wt.% to about 50 wt.% water.

The sulfated O-glycosides may be added to the slurry as a 0.1% to 100% active sulfated O-glycoside product, the remainder of th product being composed of unsulfated O-glycosides, sulfated and unsulfated aliphatic or aromatic alcohol(s), sulfated and unsulfated saccharide(s) and polysaccharides, or other crude reaction products; carrier fluids such as water or solvents; comminuted coal; or co-additives.

All percentages, amounts and ratios herein are "by weight" unless specified otherwise.

Preferred comminuted coal concentrations in a CWS are from about 60% to about 75% by weight, based on the total amount of the aqueous slurry. Preferably, at least 40 wt.% of the coal particles should be smaller than 200 mesh. As will be described infra, coals having particle size distributions skewed toward particular ranges within this broad range may be most preferable, depending upon the type of coal or the type of sulfated O-glycosides used in the slurry.

The sulfated O-glycosides of the present invention have the formula $$RO(R'O)_t-(Z)_x-(SO_4M)_n$$

wherein $RO(R'O)_t$ is the aglycone, R is an aliphatic or aromatic hydrocarbon group (linear or branched; open-chain or cyclic; saturated or unsaturated; and, optionally, substituted with nonionic groups composed of carbon, hydrogen, oxygen, and combinations thereof) of from 6 to about 32 carbon atoms, R' is an alkyl group (linear or branched; and, optionally, substituted with the hydroxy group) of from 2 to 4 carbon atoms, t is a single number or distribution of numbers from 0 to about 30, Z is the glycosyl moiety (i.e., the residue of a reducing monosaccharide), x is a single number or distribution of numbers of from 1 to about 10, n is a single number or distribution of numbers from 1 to 3x+1, and M is an inorganic or organic cation (e.g., sodium, potassium, calcium, ammonium, or monoethanolamine). Preferably R is alkyl or alkenyl of from 8 to 22 carbon atoms, t is 0, Z is the glucosyl moiety, x is from 1 to about 3, n is from 1 to 10 and M is ammonium. In the $SO_4M$ (i.e., sulfate) moiety, $SO_3M$ (i.e., sulfonate) is primarily attached to the glycosyl through an oxygen atom pendant from the glycosyl moiety, therefore the compound is properly designated as a sulfate, rather than a sulfonate.

O-glycosides are prepared by alkylation of "reducing monosaccharides". These include the hexoses and pentoses. Typical examples are glucose, mannose, galactose, fructose, rhamnose, ribose, talose, xylose, and the like. For reasons of convenience and availability, a preferred reducing monosaccharide is glucose. Materials which can be hydrolyzed to reducing saccharides can serve as the source of saccharide. These include starches, dextrin, maltose, lactose, sucrose, cellulose, cellobiose, hemicelluloses, glycogens, levoglycosan, methyl glucoside, ethyl glucoside, propyl glucoside, isopropyl glucoside, butyl glucoside, ethoxylated ethylene glycol glucoside, ethoxyethyl glucoside, and glycerol glucoside. For reasons of convenience and availability, a preferred material that can be hydrolyzed to a reducing saccharide is cornstarch.

The O-glycosides are known compounds which can be prepared by a variety of techniques. The general techniques do differ, however, between those for alkyl and arylalky O-glycosides and those for aryl and alkaryl O-glycosides.

The alkyl and arylalkyl O-glycosides can be prepared by the acid-catalyzed reaction of an alkanol or arylalkanol (or an alkoxylated aliphatic or aromatic alcohol) with a reducing monosaccharide (or a compound hydrolyzable to a reducing monosaccharide). Examples of suitable alcohols are cyclohexyl, benzyl, octyl, 2-ethylhexyl, isononyl, decyl, dodecyl, tridecyl (mixed isomers), hexadecyl, octadecyl, oleyl, hydroxystearyl, and isostearyl alcohols. If the alcohols are alkoxylated, the alkoxy groups can be ethoxy, propoxy or butoxy groups or mixtures thereof. Examples are the reaction product of dodecanol with five moles of ethylene oxide and the reaction product of p-nonylphenol with five moles of propylene oxide. For purposes of simplicity herein, the terms alkyl and arylalkyl will be understood to include alkenyl and arylalkenyl, unless specified otherwise.

Preparation of O-glycosides (of the alkyl and arylalkyl type) is described in U.S. Pat. Nos. 3,547,828, Mansfield et al., issued Dec. 15, 1970; 3,839,318, Mansfield, issued Oct. 1, 1974; 3,219,656, Boettner, issued Nov. 23, 1965; 3,721,633; Ranauto, issued Mar. 20, 1973; 3,772,269, Lew, issued Nov. 13, 1973; and 3,598,865, Lew, issued Aug. 10, 1971; all incorporated herein by reference.

The aryl and alkaryl O-glycosides traditionally have been prepared by anomeric halogen replacement [e.g., Michael, Am. Chem. J., 1, 305 (1879); ibid., 6, 336 (1885); Koenigs and Knorr, Ber., 34, 957 (1901); and Borkowski et al., Acta. Polon. Pharm., 34, Nr. 3, 251 (1977)]; glycoside ester group replacement [e.g., Helferich and Schmitz-Hillebrecht, Ber., 66, 378 (1933); and Montgomery et al., J. Am. Chem. Soc., 64, 690 (1942)]; and orthoester intermediates [e.g., Bochkov et al., Izv. Akad. Nauk. USSR, Ser. Khim., 1143 (1960)]. More recently, aromatic O-glycosides have been prepared by the direct replacement of the anomeric hydroxyl group with weakly acidic aryloxy residues in the presence of a protic acid system [e.g., Grynkiewicz, Pol. J. Chem., 53, 1571, (1979)]. Examples of suitable aromatic alcohols for use in preparing aryl and alkaryl O-glycosides are phenol, cresol, tert-butylphenol, octylphenol, nonylphenol, decylphenol, 7-octenylphenol, hydroxybenzyl alcohol, hydroxybenzaldehyde, hydroxybenzoic acid, naphthol, and hydroxynaphthoic acid. All of the foregoing patents and literature references relating to preparation of O-glycosides are incorporated herein by reference.

The structure of one of a number of possible isomers of the O-glycoside resulting from the reaction of dodecyl alcohol and glucose (i.e., dodecyl glucoside) can be represented as follows:

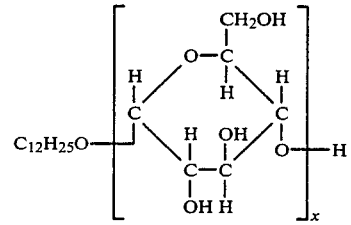

wherein x is the number of repeating glucosyl units.

The product of the reaction between aliphatic or aromatic alcohol(s) or alkoxylated alcohol(s) and saccharide(s) is a complex mixture of O-glycosides differing in isomeric configuration and in number of glycosyl units, and containing polysaccharides (i.e., polymerized saccharide which has not been etherified with alcohol), unreacted monosaccharide(s) or unhydrolyzed sources of monosaccharide(s), unreacted alcohol(s), neutralized catalyst, possibly polyalkylated glycosides, and other unknown reaction by-products. If the O-glycosides are made by the latent solvent method described in U.S. Pat. Nos. 3,772,269 and 3,598,865, the reaction product will also contain O-glycosides of the lower alkanols or glycols used as the latent solvent. The unpurified reaction product can be used as the source of O-glycoside to produce the sulfated O-glycosides of the present invention. Usually, unreacted alcohol is the major contaminant in the O-glycoside reaction product, and it is the easiest to remove (e.g., by distillation). See U.S. Pat. No. 4,393,203, Mao et al., issued July 12, 1983. Preferably the alcohol is removed from the O-glycoside reaction product before it is sulfated to produce the sulfated glycosides of the present invention. If alcohols are present in the O-glycoside during the sulfation step, sulfated alcohols are formed. These are inferior to the sulfated O-glycosides as dispersants for CWS, therefore it is desirable that the alcohols be removed from the O-glycosides before sulfation.

The sulfated O-glycosides of the present invention are prepared by conventional techniques such as are used in sulfating fatty alcohols or fatty alcohol ethoxylates. This involves reacting the O-glycoside with a sulfating agent, such as chlorosulfonic acid, sulfuric acid, sulfur trioxide, or sulfur trioxide complexed with amines (e.g., pyridine) ethers or alkyl phosphates (e.g., triethyl phosphate). The reaction is preferably carried out in a solvent such as dimethylformamide or pyridine, followed by neutralization with a base such a sodium, potassium, calcium, ammonium hydroxide, anhydrous ammonia, or monoethanolamine. It is believed that sulfation primarily occurs on hydroxyl groups pendant to the glycosyl moiety. Generally, the molar ratio of sulfating agent to average number of glycosyl moieties in the O-glycoside should be from about 0.5:1 to about 5:1, preferably from about 1:1 to about 3:1. Preparation of sulfated O-glycosides is disclosed by Turney et al., *Nature*, No. 212, pp. 537–38 (1959) and will be further illustrated in the examples herein.

Although the reason for the excellent results exhibited by the sulfated O-glycosides used in the present invention cannot yet be fully explained, the following is offered by way of theory. The invention, of course, is not to be limited in any way by this proposed theoretical explanation.

Sulfated O-glycosides have a molecular configuration that has a distinctively hydrophobic end or tail and a distinctively hydrophilic end or head. However, these materials differ from other classes or surfactants in that the hydrophilic head portion of the molecule is large and bulky with a high concentration of hydroxyl and/or sulfate groups which have a very high affinity for water. The degree of molecular bulkiness or hydrophilicity can be varied, of course, by controlling the number of glycosyl units (x) in each O-glycoside molecule and the degree of sulfation (n) of those glycosyl units. Similarly the bulk and hydrophobicity of the sulfated O-glycoside can be controlled by selection of the aglycone group.

Coal is a highly variable substance with an exceedingly complex chemical structure, which has not yet been fully and conclusively defined. The relative hydrophobicity of the surface of a coal particle varies according to its innate chemical composition and can be altered by oxidation due to air exposure. Relative to petroleum, coal may be more hydrophilic. Relative to water it is clearly hydrophobic and not readily wetted by water. This is particularly true for freshly ground coal which has surfaces which have not been altered by air oxidation. In the absence of surfactants, coal particles do not easily disperse in water and tend to form agglomerates or clumps of particles.

In water solutions, the surface-active sulfated O-glycosides are readily attracted to the interface between coal particles and water with the hydrophobic end of the glycoside adsorbed on the nonpolar surfaces of the coal. The bulky hydrophilic end of the sulfated O-glycoside is oriented away from the coal surface into the bulk of the continuous water phase. The bulky glycoside heads hydrate and are associated with water molecules and form an effective barrier around each particle. The sulfate groups also establish an electrostatic barrier that repels particles of the same charge. These barriers act to efficiently wet the particles and inhibit contact between and agglomeration of the particles, thus acting as an effective wetting and dispersing additive.

The amount of sulfated O-glycoside needed to disperse and suspend the coal particles is dependent upon the amount of coal surface available; i.e., the amount and particle size distribution of the coal in the slurry. In general, the smaller the coal particles, the greater is the surface area per unit weight of coal and the greater is the amount of a given sulfated O-glycoside required.

Many variables are known to influence the viscosity and stability of a coal-water slurry; e.g., coal particle size/shape distribution, coal source/treatment, coal concentration, pH, types and concentrations of additives, method of preparation, and conditions of storage and handling. When coal-water slurries are produced using the sulfated O-glycosides of the present invention, selection of the composition, concentration, and purity of the preferred sulfated O-glycosides must take the preceding variables into account.

Because of the large differences in properties of coals from different sources and the differences in properties of sulfated O-glycosides made from different alcohol and saccharide reactants, no rules have been found which can be applied universally to formulation of coal slurries within the scope of the present invention. Trial and error experimentation is sometimes necessary to achieve slurries having the particular properties sought by the formulator. Nevertheless, the following guidelines have been found useful in formulating CWS's using sulfated O-glycosides:

1. With higher rank coals (i.e., more hydrophobic), sulfated O-glycosides with long R's (e.g., of about 18 carbon atoms) and relatively short glycosyl chains (i.e., lower x) are likely to be desirable for producing thinner slurries. The converse is likely to be true for lower rank coals (i.e., more hydrophilic).

2. The physiochemical characteristics of coal particle surfaces vary depending on the source of the coal and its treatment. Preferred sulfated O-glycosides can be identified by screening sulfated O-glycosides which differ in their balance of hydrophilic and lipophilic character, which is primarily a function of R, R', t, x and n in the sulfated O-glycoside generic formula

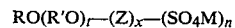

$$RO(R'O)_t\text{---}(Z)_x\text{---}(SO_4M)_n$$

In this screening process, the optimal level of the preferred sulfated O-glycosides can be determined. Both under- and over-usage of the sulfated O-glycosides can result in less than preferred physical characteristics for the slurry.

3. pH can be a factor in obtaining low viscosity slurries at minimum surfactant usage level. The typical "unadjusted" pH of slurries formed in accordance with the invention is from about 4 to about 9, depending on the chemistry of the incorporated coal. The literature has discussed the adjustment of pH to about 8 as an aid to obtaining good CWS properties. Therefore, if a particular sulfated O-glycoside-containing coal slurry is not satisfactory, variations should be prepared wherein the pH is adjusted upwards or downwards with base or acid to establish the pH which produces the best results.

4. Co-additives can importantly influence the properties of the CWS:

a. Bases, such as sodium hydroxide or ammonium hydroxide, in an amount of from about 0.01% to about 3% of the CWS are sometimes useful in increasing the "ionic character" of the CWS system, usually providing some thinning effect.

b. Suspending agents such as clays, starches and gums, can be used to inhibit the settling of the coal particles when the slurry is left standing without agitation. Suspending agents are typically used at levels up to about 1.0% of the composition.

c. To prevent possible microbiological growth in the CWS, up to about 0.5% of an antimicrobial agent (e.g., formaldehyde) may be added.

d. If excessive foaming occurs during the preparation or handling of the CWS, up to about 0.5% of a defoaming agent may be added to the slurry. Typical defoaming agents which can be used are the silicones. Also, addition of free fatty alcohols can reduce foaming.

The sulfated O-glycoside surfactants (100% active basis) of the present invention are added to an aqueous slurry of coal in an amount of 0.01% to 5% by weight, preferably 0.05% to 4%, most preferably 0.1% to 2.5% by weight, based on the total amount of the aqueous slurry. Ordinarily, when a surfactant is not added to an aqueous slurry of coal powder, the viscosity abruptly increases if the concentration of coal exceeds about 40-45% by weight based on the total amount of the slurry, although this critical value varies to some extent depending on the kind and particle size of coal powder. If the coal concentration is too low in the aqueous coal slurry, the transportation efficiency is lowered and the slurry must undergo an expensive dehydration step before combustion, thus detracting from the favorable economics of CWS use. If the coal concentration is too high, the viscosity correspondingly becomes too high. Accordingly, the coal concentration is adjusted to 50% to 85% by weight, preferably 60% to 75% by weight, although the specified coal concentration may be varied to some extent depending on the type of coal, the desired viscosity, and whether or not one may choose to include certain additives, as discussed supra.

The invention will be illustrated by the following examples. The examples are not in any way to be construed as limitative of the scope of the present invention.

EXAMPLE I

Preparation of $C_{16}$-$C_{18}$ O-Glycoside

An O-glycoside surfactant wherein the aglycone is $C_{16}$-$C_{18}$ alkyl (referred to hereinafter as "AG-168") was prepared using the following reagents:

TABLE 1

| Reagent | Source |
| --- | --- |
| Glucose Syrup (Clearsweet 95-37) | Cargill, Inc. |
| $C_{16}$-$C_{18}$ Fatty Alcohol (TA1618F) | Procter & Gamble |
| Dodecyl Benzene Sulfonic Acid (Bio-Soft S-100) | Stepan Chemical |
| Sodium Perborate (S-340) | Fisher Scientific |
| Sodium Methylate (S-335) | Fisher Scientific |

Ninety pounds (198 kg) of $C_{16}$-$C_{18}$ fatty alcohol was placed into a 42-gallon (159 liter) Inconel reactor and heated to 240° F. (116° C.). The pressure in the reactor was reduced to 80-85 mm Hg and a small nitrogen bleed was established. The reactor was maintained at these pressures and temperature conditions throughout the reaction. One hundred twenty grams of dodecyl benzene sulfonic acid and 18.5 grams of sodium perborate were added. Twenty-eight pounds (61.7 kg) of glucose syrup (72/28 sugar/water; 95% dextrose equivalent) was then added to the reactor at a rate of 7 pounds per hour (15.4 kg per hour). Reaction temperature and pressure were maintained until less than 0.2 weight percent glucose remained (4.9 hours after the start of syrup addition). Pressure was increased to 375 mm Hg as the reaction mixture was cooled to 210° F. (99° C.). The reaction mixture was neutralized with 78 grams of 25% sodium methylate in methanol.

Fifty pounds (110 kg) of the crude product was further neutralized with 26.3 grams of 25% sodium methylate in methanol. This mixture was then stripped of fatty alcohol using a Luwa evaporator at 435° F. (224° C.) and 1.7 mm Hg, such that the final fatty alcohol content (determined by GC) was 8%.

Using gas and liquid chromatography, this AG-168 product was analyzed to contain at least 43.5% O-glucosides (32.9% $RZ_1$, 7.3% $RZ_2$, 2.3% $RZ_3$, and 1.0% $RZ_4$), 8% fatty alcohol, and 8.9% polysaccharides. In the term $RZ_x$, as used above, R signifies $C_{16}$-$C_{18}$ alkoxy, Z signifies the glucosyl moiety, and x signifies the number of repeating glucosyl units in a chain.

EXAMPLE II

Preparation of Sulfated O-Glycoside

A sulfated O-glycoside surfactant wherein the aglycone is a $C_{16}$-$C_{18}$ alkyl (referred to hereinafter as SAG-168) was prepared using the following reagents:

TABLE 2

| Reagent | Source |
| --- | --- |
| Dimethylformamide (D15,855-0) | Aldrich Chem. Co. |
| Sulfur Trioxide (22,769-2) | Aldrich Chem. Co. |
| Dichloroethane (DX0800) | EM-Science |
| Methanol (MX-0485) | EM-Science |
| Anhydrous Ammonia | Matheson Gas Co. |
| Ammonium Carbonate (A-652) | Fisher Scientific |

Four hundred and fifty-four grams of AG-168 (prepared in Example I) and 1.8 liters of dimethylformamide were placed into a 5-liter flask equipped with a magnetic stirrer. The mixture was heated to 80° C. and mixed at this temperature until the AG-168 was completely dissolved. This mixture is referred to as Mixture A.

Three hundred sixty milliliters of dichloroethane were placed into a 1-liter flask. Two hundred forty grams of melted sulfur trioxide were then added. This mixture is referred to as Mixture B.

Mixture A was placed into a 5-liter round bottom flask equipped with a dropping funnel, a mechanical agitator, and a thermometer. The mixture was cooled to 10° C. in a methanol-ice bath. Mixture B was placed into the dropping funnel and slowly added to Mixture A over a two hour period. The mixture was maintained at 25° C. by varying the rate of addition of Mixture B. After all of Mixture B was added, the combined mixture was maintained at 25° C. for 24 hours. The mixture was then cooled to 15° C. by the use of a methanol-ice bath. Anhydrous ammonia was slowly added to the mixture through a fritted glass tube. The temperature was allowed to rise to 30°-35° C. where it was controlled by the use of the methanol-ice bath and by varying the rate of ammonia addition. Ammonia addition was stopped when heat was no longer generated. The solvents were then evaporated from the crude product at 90° C. and 25 mm Hg. The weight of the crude product was 650 grams.

The crude product was worked up as follows. The solids were ground and placed into a 5-liter glass flask, along with 3.25 liters of methanol. The resultant slurry was heated to reflux temperature (45°-55° C.), agitated for one hour at this temperature, and vacuum filtered. To the filtrate, 0.65 grams of ammonium carbonate was added and stirred until dissolved. The methanol was evaporated from the product at 90° C. and 25 mm Hg. The product was placed in a vacuum oven at 70° C. and 5 mm Hg for 6 hours. This is referred to as Product B.

A second lot of sulfated O-glycoside was prepared by the same method. This is referred to as Product C. 450 grams of Product B and 375 grams of Product C were ground together to make Product D. This is referred to as SAG-168.

Using liquid chromatography, the SAG-168 was analyzed to contain at least 54% ammonium sulfated O-glycosides (3% $RZ_1(SO_4M)_1$, 22% $RZ_1(SO_4M)_2$, 25% $RZ_1(SO_4M)_3$, and 4% $RZ_2(SO_4M)_{1-3}$), 12.4% ammonium alkyl sulfate, 0.22% inorganic sulfates, less than 1% alkyl glycosides, less than 1% fatty alcohol, and less than 1.3% volatiles. The remainder of the sample was sulfated and unsulfated saccharides and polysaccharides, and reaction by-products. In the term $R(Z)_x(SO_4M)_n$, as used above, R signifies $C_{16}$-$C_{18}$ alkoxy, Z signifies the glucosyl moiety, x signifies the number of repeating glucosyl units in a chain, $SO_4M$ signifies the ammonium sulfate moiety, and n signifies the number of ammonium sulfate units attached to $Z_x$.

EXAMPLE III

In this example, a sulfated O-glycoside surfactant prepared according to the previous example was formulated into a coal-water slurry and the properties of that slurry were compared with those of slurries prepared with an unsulfated tallow ($C_{16}$-$C_{18}$) O-glycoside and the following commercially available surfactants:

Lomar PWA (ammonium salt of a condensed naphthalene sulfonic acid) obtained from Diamond Shamrock Corporation; Igepal CO-997 (nonylphenoxy(polyethyleneoxy)ethanol having a molecular weight of about 4,680) obtained from GAF Corporation ; Marasperse CBOS-3 (highly purified sodium lignosulfonate) obtained from Reed Lignin Corporation; Pluronic F108 (polyoxyethylene/polyoxypropylene condensate having a molecular weight of about 14,000) obtained from BASF/Wyandotte Corporation; AGS (sodium $C_{12}$-$C_{14}$ glycerol ether sulfonate) obtained from the The Procter & Gamble Company; Dextran sulfate (sodium salt having a molecular weight of about 8000) obtained from Sigma Chemical Company; LAS (sodium $C_{13}$ linear alkyl benzene sulfonate) obtained from Conoco Chemical Company; $TAE_3S$ (sodium $C_{16}$-$C_{18}$ polyethoxy-3 sulfate) obtained from Procter & Gamble; and TAS (sodium $C_{16}$-$C_{18}$ alkyl sulfate) obtained from Procter & Gamble.

Eastern Bituminous coal, having the following characteristics, was used in preparing the slurries.

TABLE 3

| | |
|---|---|
| Moisture | 1.9 Wt. % |
| Ash | 6.30 Wt. % |
| Sulfur | 0.72 Wt. % |
| Volatiles | 35.75 Wt. % |
| Fixed Carbon | 56.53 Wt. % |
| BTU | 13395/lb. |

This coal was pulverized to a size such that 60.6 wt.% passed through a 200 mesh sieve and 45.9 wt.% passed through a 325 mesh sieve. While this particular pulverized coal was used for illustrative purposes, it should not be construed that the invention is restricted thereto.

Coal-water slurries containing 70 wt.% coal (on an "as received" basis) were prepared for evaluation in the following manner. The amount of surfactant needed to attain the desired usage concentration in a 350 gram batch was weighed into a beaker. The desired weight of distilled water was then added to the surfactant. The surfactant and water were heated to 180° F. (82° C.) for about 5 minutes with occasional mixing. After the surfactant was dispersed, the surfactant/water mixture was placed into a high shear blender, and 145 grams of pulverized coal (described above) was added. The slurry components were then mixed on the mixer's highest speed setting for 30 seconds. Ten drops of defoamer (General Electric AF-72 silicone emulsion—30% active) and 2 milliliters of 28% ammonium hydroxide in water were added, and mixing was restarted. The remaining coal was added in about 20 gram increments until the slurry contained a total of 245 grams of coal. The last addition of coal was made by about 8 minutes, followed by additional mixing until 9.5 minutes of total mixing time from the start of coal addition had elapsed. The slurry was then reweighed, water lost through evaporation was added back, 0.25 milliliters of 36% formaldehyde was added to avoid possible microbial growth, and the slurry was mixed for an additional 30 seconds to conclude the slurry-making procedure. Table 4 summarizes the compositions of the various coal-water slurries which were prepared.

The finished slurry was transferred from the blender to a 1-pint glass jar. After cooling to room temperature, the viscosity of each CWS was measured using a Brookfield synchro-lectric viscometer Model RVT with a #3 spindle. Viscosities were measured at 5, 10, 20 and 50 rpm (or to as high as possible using the #3 spindle). The readings were taken at each successive speed after running for 4 minutes at that speed.

The viscosity results obtained in this example are summarized in Table 5. It may be observed that not all surfactants make slurries at the usage level represented by this example. SAG-168 made the thinnest slurry at this usage level.

TABLE 4

Coal-Water Slurry Formulations*

| Additive | Weight Additive (Grams) | % Solids in Additive | Weight Distilled Water (Grams) |
|---|---|---|---|
| SAG-168 | 1.488 | 100 | 103.5 |
| Lomar PWA | 1.488 | 100 | 103.5 |
| Marasperse CBOS-3 | 1.488 | 100 | 103.5 |
| Tallow O—Glycoside | 1.488 | 100 | 103.5 |
| AGS | 2.975 | 50 | 102.0 |
| Dextran sulfate | 1.488 | 100 | 103.5 |
| Igepal CO-997 | 1.488 | 100 | 103.5 |
| LAS | 1.653 | 90 | 103.3 |
| Pluronic F108 | 1.488 | 100 | 103.5 |
| TAS | 1.599 | 93 | 103.4 |

TABLE 4-continued

| | Coal-Water Slurry Formulations* | | |
|---|---|---|---|
| Additive | Weight Additive (Grams) | % Solids in Additive | Weight Distilled Water (Grams) |
| TAE₃S | 5.313 | 28 | 99.7 |

*In addition to the ingredients in the Table, each slurry contained 245 grams coal (on an "as received" basis), 1.8 grams 28% ammonium hydroxide, 0.06 grams General Electric AF-72 (30% active), and 0.27 grams 36% formaldehyde.

TABLE 5

| | Test Results on Formulations in Table 4 | | | |
|---|---|---|---|---|
| Additive | Weight % Additive Solids in CWS | % Active in Additive Solids | Calculated Weight % Active in CWS | Viscosity (cp) |
| SAG-168 | 0.42 | 54 | 0.23 | 900 |
| Lomar PWA | 0.42 | 89 | 0.38 | 1,150 |
| Marasperse CBOS-3 | 0.42 | 100 | 0.42 | 1,800 |
| Tallow O—glycoside | 0.42 | 97 | 0.41 | 10,000 |
| AGS | 0.42 | 100 | 0.42 | 10,000 |
| Dextran sulfate | 0.42 | 100 | 0.42 | 10,000 |
| Igepal CO-997 | 0.42 | 100 | 0.42 | 10,000 |
| LAS | 0.42 | 100 | 0.42 | 10,000 |
| Pluronic F108 | 0.42 | 100 | 0.42 | 10,000 |
| TAS | 0.42 | 100 | 0.42 | 10,000 |
| TAE₃S | 0.42 | 100 | 0.42 | 10,000 |

Note:
Viscosity measured at 10 rpm.

EXAMPLE IV

In this example, a sulfated O-glycoside surfactant prepared according to Example II was formulated into a coal-water slurry, and the properties of that slurry were compared with those of slurries made with Lomar PWA (ammonium salt of a condensed naphthalene sulfonic acid) obtained from Diamond Shamrock Corporation and Marasperse CBOS-3 (highly purified sodium lignosulfonate) obtained from Reed Lignin Corporation.

The same Eastern Bituminous coal described in Example III was used to make these slurries.

Coal-water slurries containing 70 wt.% coal (on an "as received" basis) were prepared for evaluation in the following manner. The amount of surfactant needed to attain the desired usage concentration in a 350 gram batch of slurry was weighed into a beaker. The desired weight of distilled water was then added to the surfactant. The surfactant and water were heated to about 180° F. (82° C.) for about 5 minutes with occasional mixing. After the surfactant was dispersed in the water, the surfactant/water mixture was placed into a high shear blender, and 145 grams of pulverized coal (described above) were added. The slurry components were then mixed on the mixer's highest speed setting for 30 seconds. Ten drops of defoamer (General Electric AF-72 silicone emulsion—30% active) and 2 milliliters of 28% ammonium hydroxide in water were added, and mixing was restarted. The remaining coal was added in about 20 gram increments until the slurry contained a total of 245 grams of coal. The last addition of coal was made by about 8 minutes, followed by additional mixing until 9.5 minutes of total mixing time from the start of coal addition had elapsed. The slurry was then reweighed, water lost through evaporation was added back, 0.5 milliliters of 36% formaldehyde was added to avoid possible microbial growth, and the slurry was mixed for an additional 30 seconds to conclude the slurry making procedure. Table 6 summarizes the compositions of the various coal-water slurries which were prepared.

The finished slurry was transferred from the blender to a 1-pint glass jar. After cooling to room temperature, the viscosity of each CWS was measured using a Brookfield Synchro-Lectric viscometer Model RVT with a #3 spindle. Viscosities were measured at 5, 10, 20, and 50 rpm (or to as high as possible using the #3 spindle). The readings were taken at each successive speed after running for 4 minutes at that speed.

Table 7 summarizes the viscosity results obtained in this example. For each CWS formulation the additive concentration is shown both "as is" and corrected for the actual amount of active surfactant. The sample of Lomar PWA used was an 89% active powder; the sample of Marasperse CBOS-3 used was a 100% active powder; and the sample of SAG-168 used was a 54% active powder. The results summarized in Table 7 on the basis of active surfactant present in the slurry, clearly illustrate that sulfated O-glycosides are highly effective dispersants for coal-water slurries at low usage concentrations.

TABLE 6

| | Coal-Water Slurry Formulations* | |
|---|---|---|
| Additive | Weight Additive (grams) | Weight Distilled Water (grams) |
| Lomar PWA | 0.700 | 104.3 |
| Lomar PWA | 0.875 | 104.2 |
| Lomar PWA | 1.050 | 103.9 |
| Lomar PWA | 1.225 | 103.5 |
| Lomar PWA | 1.486 | 103.5 |
| Marasperse | 1.050 | 103.9 |
| Marasperse | 1.225 | 103.5 |
| Marasperse | 1.486 | 103.5 |
| SAG-168 | 0.700 | 104.3 |
| SAG-168 | 0.875 | 104.2 |
| SAG-168 | 1.050 | 103.9 |
| SAG-168 | 1.225 | 103.5 |
| SAG-168 | 1.486 | 103.5 |

*In addition to the ingredients in Table 1, each slurry contained 245 grams coal (on an "as received" basis), 1.8 grams 28% ammonium hydroxide, 0.06 grams General Electric AF-72 (30% active), and 0.27 grams 36% formaldehyde.

TABLE 7

| | Test Results on Formulations in Table 6 | | | |
|---|---|---|---|---|
| Additive | Weight % Additive in CWS | Weight % Active in Additive | Calculated Weight % Active in CWS | Viscosity (cp) |
| Lomar PWA | 0.20 | 89 | 0.18 | 2,100 (1) |
| Lomar PWA | 0.25 | 89 | 0.22 | 1,400 (1) |
| Lomar PWA | 0.30 | 89 | 0.27 | 2,600 (2) |
| Lomar PWA | 0.35 | 89 | 0.32 | 1,650 (2) |
| Lomar PWA | 0.425 | 89 | 0.38 | 1,183 (3) |
| Marasperse CBOS-3 | 0.30 | 100 | 0.30 | 10,000 (1) |
| Marasperse CBOS-3 | 0.35 | 100 | 0.35 | 2,383 (3) |
| Marasperse CBOS-3 | 0.425 | 100 | 0.425 | 1,800 (1) |
| SAG-168 | 0.20 | 54 | 0.11 | 8,900 (1) |
| SAG-168 | 0.25 | 54 | 0.14 | 3,200 (1) |
| SAG-168 | 0.30 | 54 | 0.16 | 3,050 (2) |
| SAG-168 | 0.35 | 54 | 0.19 | 1,300 (2) |
| SAG-168 | 0.425 | 54 | 0.23 | 750 (2) |

Note:
Viscosity was measured at 10 rpm. The number of slurry replicates is shown in parentheses. The viscosity value shown is the average of these replicates.

What is claimed is:
1. Coal-water slurry compositions comprising:

(a) from about 50% to about 85% of finely divided coal particles having a particle size such that substantially none of said particles has a size greater than 4 Tyler mesh;

(b) from about 0.01% to about 5.0% of sulfated O-glycosides having the formula $$RO(R'O)_t-(Z)_x-(SO_4M)_n$$

wherein R is selected from the group consisting of substituted and unsubstituted aliphatic and aromatic hydrocarbons having from 6 to about 32 carbon atoms, wherein the substituents are nonionic groups consisting of carbon, hydrogen, oxygen and combinations thereof, R' is selected from substituted and unsubstituted alkyl groups having from 2 to 4 carbon atoms, wherein the substituent is hydroxy, t is a single number or distribution of numbers from 0 to about 30, Z is the residue of a reducing monosaccharide, x is a single number or distribution of numbers from 1 to about 10, n is a single number or distribution of numbers from 1 to $3x+1$, and M is an inorganic or organic cation; and (c) from about 10% to about 50% water.

2. The composition of claim 1 wherein at least 40% of the coal particles are smaller than 200 mesh.

3. The composition of claim 2 wherein Component (b) is incorporated into said composition as a 0.1% to 100% active sulfated O-glycoside product, the remainder of said product comprising unsulfated O-glycosides, sulfated and unsulfated aliphatic or aromatic alcohol(s), sulfated and unsulfated saccharide(s) and polysaccharides, or other crude reaction products; carrier fluids; coal; or co-additives.

4. The composition of claim 3 wherein the ionic character of the slurry is increased by the addition of from about 0.01% to about 3% ammonium hydroxide.

5. The composition of claim 3 wherein the composition contains up to about 1.0% of a suspending agent.

6. The composition of claim 3 wherein the composition contains up to about 0.5% of an antimicrobial agent.

7. The composition of claim 3 wherein the composition contains up to about 0.5% of a defoaming agent.

8. The composition of claim 3, 4, 5, 6 or 7 wherein R in the sulfated O-glycoside is $C_8$–$C_{22}$ alkyl or alkenyl, t equals 0, Z is a glucosyl moiety, x is from 1 to about 3, and n is from 1 to 10.

9. The composition of claim 8 wherein the amount of Component (b) is from about 0.05% to about 4% of said composition.

10. The composition of claim 8 wherein the amount of Component (b) is from about 0.1% to about 2.5% of said composition.

11. The composition of claim 9 wherein the anount of Component (a) in said composition is from about 60% to about 75%.

* * * * *

UNITED STATES PATENT AND TRADEMARK OFFICE
CERTIFICATE OF CORRECTION

PATENT NO. : 4,597,770
DATED : July 1, 1986
INVENTOR(S) : Joseph T. Forand and James A. Hellyer It is certified that error appears in the above-identified patent and that said Letters Patent are hereby corrected as shown below:

Col. 2, line 57, "th" should read --- the ---.

Col. 5, line 20, after "such" delete "a" and insert --- as ---.

Col. 9, line 25, before "3%" insert --- about ---.

Signed and Sealed this

Twenty-eighth Day of October, 1986

[SEAL]

Attest:

DONALD J. QUIGG

*Attesting Officer*     *Commissioner of Patents and Trademarks*